Jan. 2, 1962  T. W. MERRITT ET AL  3,015,306
MILK PIPELINE SUPPORT
Filed Jan. 19, 1959  2 Sheets-Sheet 1
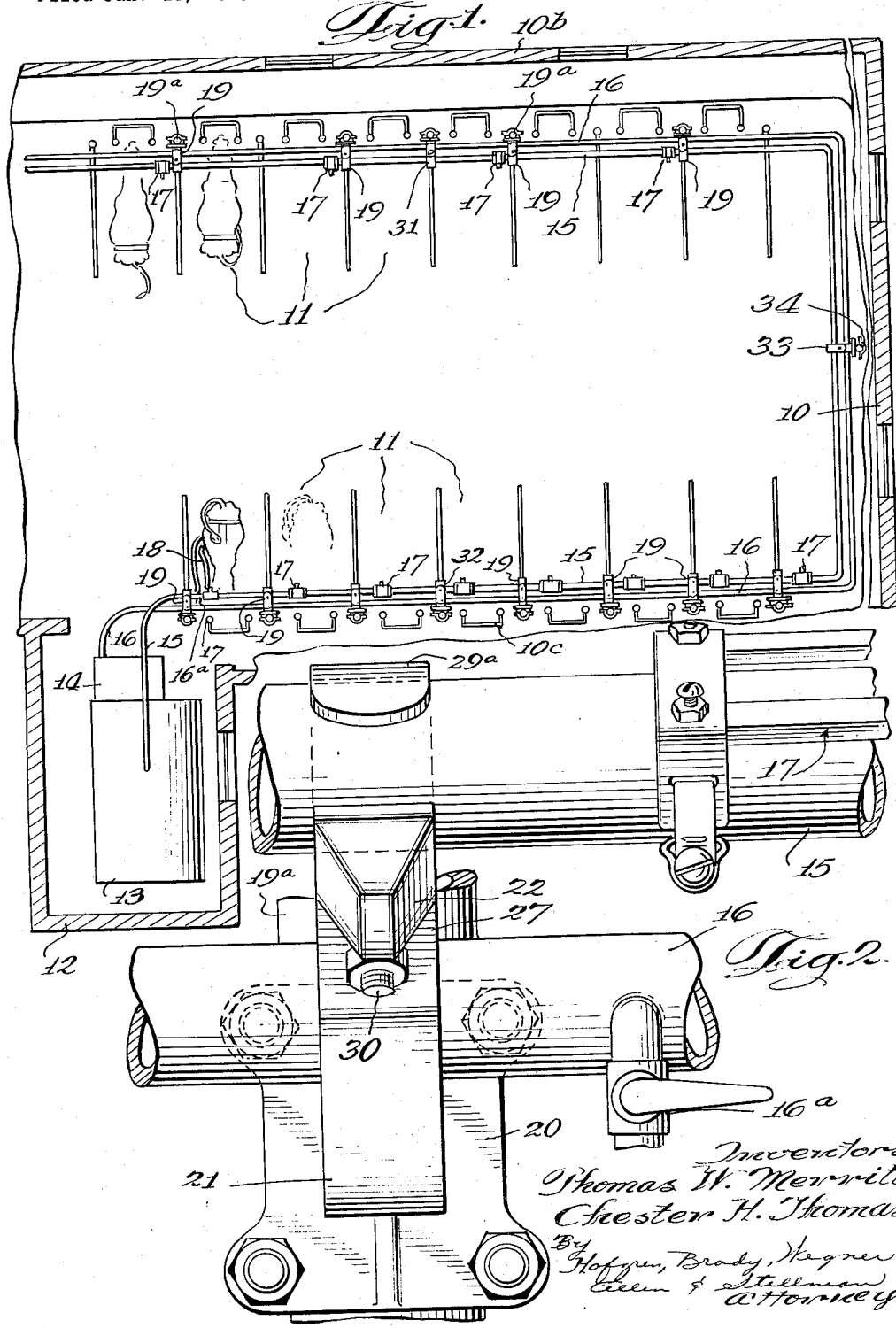
Inventors
Thomas W. Merritt
Chester H. Thomas
By Hofgren, Brady, Wegner, Allen & Stellman
Attorneys

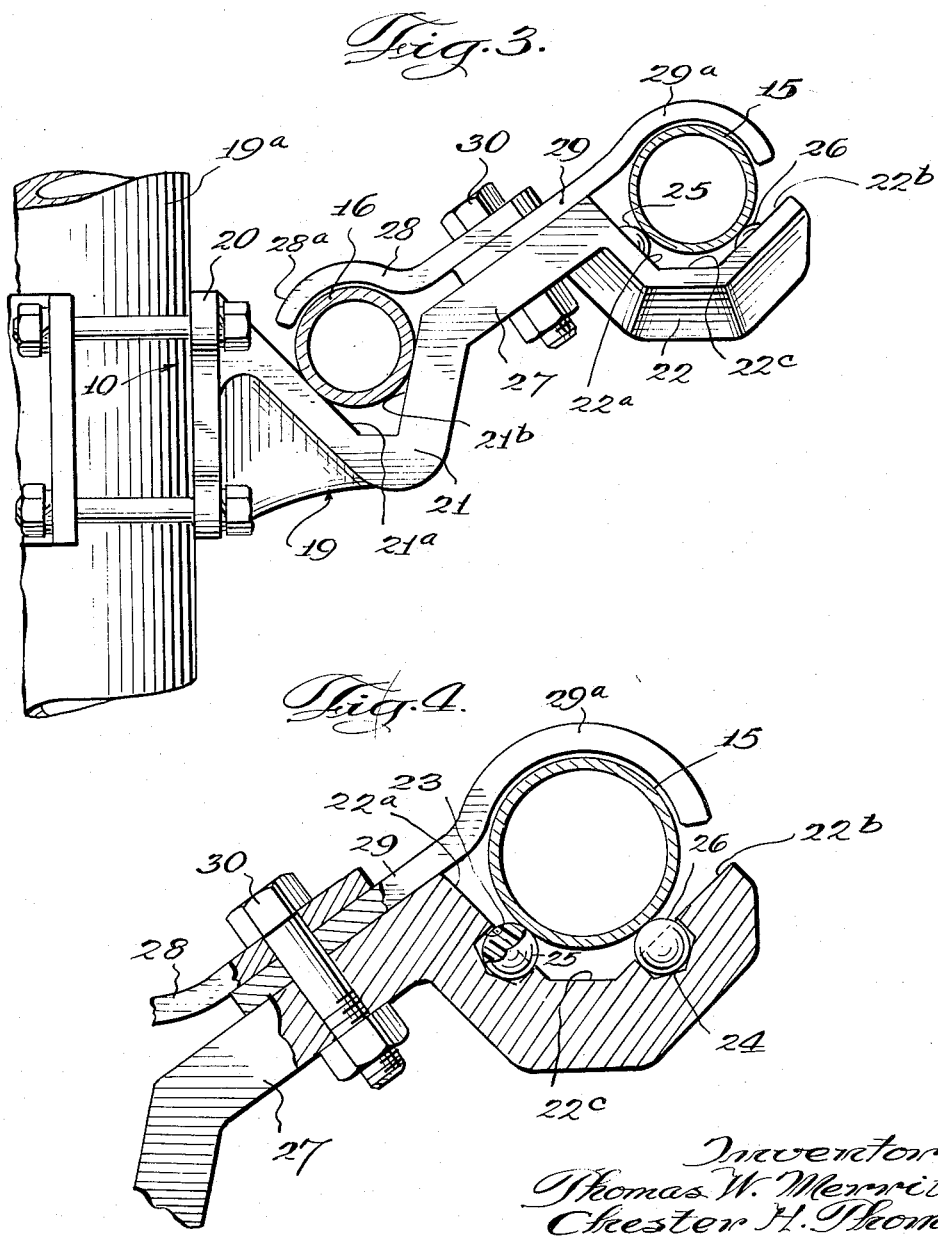

United States Patent Office 3,015,306
Patented Jan. 2, 1962

3,015,306
MILK PIPELINE SUPPORT
Thomas W. Merritt, St. Charles, and Chester A. Thomas, Lake Forest, Ill., assignors to Babson Bros. Co., a corporation of Illinois
Filed Jan. 19, 1959, Ser. No. 787,516
3 Claims. (Cl. 119—14.03)

This invention relates to a support for a pipeline or pipelines, particularly in a carry-away milking system.

In the automatic carry-away milking systems normally used on dairy farms, at least two pipelines extend through the milking area, one an evacuated carry-away milk line, and the other an evacuated line for operating the pulsator of the milk withdrawing equipment. The carry-away milk line, with which the present invention is particularly concerned, is generally of stainless steel or glass and in sections up to twenty feet in length. In the past, it has been the practice to mount both lines on brackets appropriately located throughout the milking area, rigidly clamping the pipe sections in place. The vacuum line has generally been positioned behind and above the milk line so that connections made to it overlie the milk line.

In early carry-away milking systems, it was necessary to disassemble the pipeline sections following each milking so that they might be scrubbed by hand. The preferred practice at the present, however, is to utilize "in-place" washing, wash, rinse and sanitizing solutions being circulated through the assembled pipeline to clean it. At least some of these solutions are rather hot, of the order of 150° to 160° F., and the resulting heating of the pipeline and expansion thereof often results in damage particularly to the gaskets between the pipeline sections which are subjected to extreme compressive forces.

A principal feature of the invention is the provision in a milking system of an elongated carry-away milk pipeline, a plurality of brackets spaced along the pipeline each having a pipe receiving portion with roller means carried by the portion having a pipe engaging surface spaced from the surface of the pipe receiving portion of the bracket, and means for clamping the pipeline at a central point thereof.

Another feature is the provision in a milking system of a milk pipeline, a vacuum pipeline, and bracket means supporting the pipelines in the milking area, the bracket means having spaced portions for the milk and vacuum pipelines with the milk line positioned in front of and above the vacuum line.

A further feature is the provision of a milk pipeline support including a bracket member having a pipe carrying portion with a recess therein and roller means in the recess having a pipe engaging surface spaced from the pipe receiving portion of the bracket. Yet another feature is that the pipe receiving portion of the bracket has a plurality of spaced recesses with a ball in each of them providing spaced pipe supporting surfaces. Still another feature is that the roller means is of a nonconductive material. And a further feature is that the pipe receiving portion of the bracket member has two surfaces defining an angle of the order of 90° with roller means in a recess in each of the surfaces, establishing spaced pipe supporting surfaces which engage points on the surface of the pipeline spaced apart an angular distance of the order of 90°.

Further features and advantages of the invention will readily be apparent from the following specification and from the drawings, in which:

FIGURE 1 is a diagrammatic plan view of the milking area of a stanchion barn having a milking system with milk pipelines and mountings therefor embodying the invention;

FIGURE 2 is an end elevation of a bracket embodying the invention with milk and vacuum pipe sections carried thereby;

FIGURE 3 is a side elevation of the bracket and pipes of FIGURE 2; and

FIGURE 4 is an enlarged fragmentary view partially in section, of the milk pipeline supporting portion of the bracket.

In the specific embodiment of the invention illustrated herein, the milking system in a stanchion barn is shown. It will be understood that the invention may be used with other milk pipeline systems although it is of most importance where the pipeline span is relatively long, as forty or fifty feet, or longer, and lengths of over one hundred feet are not uncommon in stanchion barn installations. For example, a stainless steel pipeline one hundred feet in length will expand one inch when its temperature is raised one hundred degrees, Fahrenheit.

Turning now to the drawings, a barn 10 is shown having stanchion stalls 11 arranged in two opposed lines. A milk house 12 opens off of the barn proper and houses a milk storage tank 13 and a vacuum source 14, as a vacuum pump and chamber. A carry-away milk pipeline 15 is connected with storage tank 13 and extends around the barn above the heads of the stalls 11. Similarly, a vacuum pipeline 16 is connected with vacuum source 14 and extends around the barn, generally parallel with milk pipeline 15. With the barn and stall arrangement illustrated, where the two rows of stanchion stalls are generally opposed to each other, the pipelines have a generally U-shaped configuration with the legs of the U extending along the heads of the stalls. Suitable valves 17 are provided at spaced points along the legs of the U-shaped milk pipeline 15. As illustrated, these valves are preferably of the type shown in Merritt and Thomas application 704,-430, filed December 23, 1957, and assigned to the assignee of this invention. It will be noted that in the upper row of stalls, a valve 17 is provided for every two stalls, while along the lower row of stalls there is a valve for each stall. This is a matter of choice and depends upon the nature of the particular milking installation.

In a stanchion barn with a carry-away milking system, the milking itself is preferably carried out with apparatus of the character described in Thomas Patent 2,783,737, issued March 5, 1957, which is suspended beneath the cow and connected with the valve as by a rubber hose, indicated at 18. The pipelines 15 and 16 are supported along their length by brackets 19 which are mounted on a suitable supporting structure as vertical pipe sections 19a connected between the stall structure and an overhead beam, the ceiling or the like, and preferably located adjacent each of the valves 17.

Turning now to FIGURES 2, 3 and 4, it will be seen that the bracket 19 includes a base portion 20 secured to the supporting surface, here a pipe 19a, and has a body extending generally upwardly and outwardly from the base, providing a first and second pipe supporting portions 21 and 22, joined by an intermediate portion 27, the pipe supporting portion 22 being above and forward of portion 21. The pipe supporting portion 21 is formed by a pair of surfaces 21a and 21b having a V-shaped configuration with a flattened bottom, receiving the vacuum pipeline 16. The second pipe receiving portion 22 includes two surfaces 22a and 22b which have an angular relation, if extended, of the order of 90°. The surface 22c joins surfaces 22a and 22b and is generally horizontal with the base 20 of the support mounted on a vertical member and the surfaces 22a and 22b extend upwardly therefrom at angles of approximately 45°.

As best seen in FIGURE 4, recesses 23 and 24 are formed in the surfaces 22a and 22b and receive pipe supporting roller members or balls 25 and 26, respectively. The milk pipeline 15 in turn rests on the surfaces of balls 25 and 26. The spacing between the two ball members is such that they engage the surface of pipeline 15 at points spaced apart an angular distance of the order of 90°, relative to the center of the pipe.

Keeper members 28 and 29 are secured to the central portion 27 of the support member 19, as by bolt 30, and have arched end portions 28a and 29a which extend over and are concentric with the pipes 16 and 15. The arched portion 29a of keeper 29 associated with the milk pipeline is spaced above the surface of the pipe, as about one-sixteenth of an inch above, so that it is free to move longitudinally, as upon expansion and contraction during washing and rinsing, without interference, on the low friction balls 25 and 26. Furthermore, pipeline 15 is free to twist or move laterally, as necessary.

Where stainless steel pipelines are used, as is the usual practice, it is important that electrolytic action between the pipeline and its support be prevented. Accordingly, it is preferable that ball supports 25 and 26 be of a non-conductive material as of nylon, or of a stainless steel material identical with that used in the pipeline. The vacuum hose 18a (FIGURE 1) for the pulsator of the milking apparatus is connected with vacuum line 16. However, as the milk pipeline 15 is above and in front of the vacuum pipeline, hose 18a passes beneath it, so that it is easy for the operator to make the connection and to manipulate vacuum valve 16a.

In the system of FIGURE 1, it is preferable that the pipeline spans be clamped rigidly at a central point to avoid excessive movement of the end portions of the pipeline. With the U-shaped pipeline configuration shown, clamps 31 and 32 are located substantially at the center of the legs of the U, and fixedly secure the pipelines at these points. Thus, the sections of the pipeline on either side of the clamping points are free to expand, but the total movement of any one portion of the pipeline is minimized. A third clamp 33 is provided at the center of the base portion of the U, and is mounted on a pipe 34 depending from an overhead support and free to move, accommodating the expansion and contraction of the pipeline.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. A support for a pipeline, comprising: a bracket member having an upwardly opening pipe receiving portion with a recess therein; roller means in said recess having a pipe engaging surface spaced from the pipe receiving portion of said bracket; a pipe resting on said roller means; and a keeper closing said upwardly opening pipe receiving portion of said bracket, arched over and spaced from while generally conforming with said pipe whereby said pipe is free to move both longitudinally and laterally.

2. In a pipe system: an elongated pipeline; a plurality of brackets spaced along said pipeline each having a pipe receiving portion with roller means carried by said portion having a pipe engaging surface spaced from the surface of the pipe receiving portion of the bracket; and means clamping said pipeline at a central point thereof.

3. The pipe system of claim 2, wherein said pipeline has a generally U-shaped configuration with a pair of legs, the legs being carried on said roller means and the clamping means are located at the center between the legs thereof.

References Cited in the file of this patent

UNITED STATES PATENTS

| | | |
|---|---|---|
| 1,097,273 | Tyler | May 19, 1914 |
| 1,385,751 | Read | July 26, 1921 |
| 1,839,313 | Hibbs | Jan. 5, 1932 |
| 2,667,855 | Scott | Feb. 2, 1954 |
| 2,730,992 | Kessler | Jan. 17, 1956 |